(12) United States Patent
Kawanishi et al.

(10) Patent No.: US 8,123,227 B2
(45) Date of Patent: Feb. 28, 2012

(54) SLIDING MEMBER

(75) Inventors: Minoru Kawanishi, Niigata-ken (JP);
Ryo Wakabayashi, Niigata-ken (JP);
Masaki Moronuki, Niigata-ken (JP);
Katsuhiro Tsuji, Niigata-ken (JP);
Takayuki Sato, Niigata-ken (JP)

(73) Assignee: Kabushiki Kaisha Riken, Tokyo (JP)

( * ) Notice: Subject to any disclaimer, the term of this patent is extended or adjusted under 35 U.S.C. 154(b) by 641 days.

(21) Appl. No.: 12/199,470

(22) Filed: Aug. 27, 2008

(65) Prior Publication Data

US 2009/0026712 A1    Jan. 29, 2009

Related U.S. Application Data (63) Continuation of application No. PCT/JP2007/053266, filed on Feb. 22, 2007.

(30) Foreign Application Priority Data

Feb. 28, 2006   (JP) .................. 2006-052790

(51) Int. Cl.
*F16J 9/26* (2006.01)
*E32B 9/00* (2006.01)
(52) U.S. Cl. ......... 277/442; 277/444; 428/408; 428/698
(58) Field of Classification Search .................. 277/440, 277/442–444; 428/217, 336, 408, 469, 698
See application file for complete search history.

(56) References Cited

U.S. PATENT DOCUMENTS

| 5,108,813 | A | * | 4/1992 | Noda et al. ..................... 428/141 |
| 5,154,433 | A | * | 10/1992 | Naruse ........................... 277/443 |
| 5,989,511 | A | * | 11/1999 | Gruen et al. .................. 423/446 |
| 6,149,162 | A | * | 11/2000 | Tanaka et al. ................. 277/443 |
| 6,279,913 | B1 | | 8/2001 | Iwashita et al. |
| 6,325,385 | B1 | | 12/2001 | Iwashita et al. |
| 7,160,616 | B2 | * | 1/2007 | Massler et al. ................ 428/408 |
| 7,255,083 | B2 | * | 8/2007 | Hamada et al. ............. 123/193.4 |
| 7,255,084 | B2 | * | 8/2007 | Savale et al. ............... 123/193.6 |
| 7,771,821 | B2 | * | 8/2010 | Martin et al. ................. 428/408 |
| 2002/0175476 | A1 | * | 11/2002 | Chinou et al. ................ 277/440 |
| 2004/0234770 | A1 | * | 11/2004 | Mori et al. ..................... 428/408 |
| 2006/0207540 | A1 | * | 9/2006 | Matsui et al. .............. 123/90.49 |
| 2009/0098361 | A1 | * | 4/2009 | Sato et al. ..................... 428/323 |

FOREIGN PATENT DOCUMENTS

| JP | 5-163909 | 6/1993 |
| JP | 7-118832 | 5/1995 |
| JP | 2000-120869 | 4/2000 |
| JP | 2000-120870 | 4/2000 |
| JP | 2001-280497 | 10/2001 |
| JP | 2004-116707 | 4/2004 |
| JP | 2006-275269 | 10/2006 |

* cited by examiner

*Primary Examiner* — Alison Pickard
(74) *Attorney, Agent, or Firm* — Slater & Matsil, L.L.P.

(57) ABSTRACT

A sliding member is characterized in that a sliding surface of the sliding member is coated with an amorphous hard carbon film, and a surface of the amorphous hard carbon film has a ten-point mean roughness of equal to or less than 0.7 micrometers and an initial wear height in a range of 0.07 to 0.14 micrometers.

17 Claims, 5 Drawing Sheets

| | | | Piston ring | | | | Cylinder liner | | FMEP reduction (%) |
|---|---|---|---|---|---|---|---|---|---|
| | Sliding surface | Base layer | Rz(μm) | | Rpk(μm) | | Rz(μm) | | |
| | | | Initial | After break-in | Initial | After break-in | Initial | After break-in | |
| Embodiment1 | Amorphous hard carbon film | Nitride | 0.7 | 0.5 | 0.07 | 0.05 | 2 | 1.5 | 42% |
| Embodiment2 | Amorphous hard carbon film | Chromium nitride | 0.6 | 0.5 | 0.1 | 0.05 | 3 | 1.4 | 45% |
| Embodiment3 | Amorphous hard carbon film | Cr-plating | 0.7 | 0.5 | 0.14 | 0.05 | 4 | 1.5 | 40% |
| Embodiment4 | Amorphous hard carbon film | – | 0.6 | 0.5 | 0.09 | 0.05 | 2.5 | 1.5 | 39% |
| Comparison1 | Amorphous hard carbon film | Nitride | 0.8 | 0.6 | 0.15 | 0.09 | 2 | 1.4 | 22% |
| Comparison2 | Amorphous hard carbon film | Chromium nitride | 0.8 | 0.6 | 0.17 | 0.09 | 3 | 1.4 | 23% |
| Comparison3 | Amorphous hard carbon film | Cr-plating | 0.8 | 0.6 | 0.23 | 0.02 | 4 | 1.4 | 22% |
| Comparison4 | Nitride | – | 0.6 | 0.5 | 0.03 | 0.02 | 2 | 1.8 | 15% |
| Comparison5 | Chromium nitride | – | 0.6 | 0.5 | 0.05 | 0.02 | 3 | 1.8 | 18% |
| Comparison6 | Cr-plating | – | 0.6 | 0.5 | 0.09 | 0.02 | 4 | 1.8 | 17% |

SLIDING MEMBER

This application is a continuation of co-pending International Application No. PCT/JP2007/053266, filed Feb. 22, 2007, which designated the United States and was not published in English, and which is based on Japanese Application No. 2006-052790, filed Feb. 28, 2006, both of which applications are incorporated herein by reference.

TECHNICAL FIELD

The present invention relates to a sliding member used for a reciprocating internal combustion engine, such as an automotive engine, and more specifically to a piston ring that slides against a bore of a cast iron cylinder liner.

BACKGROUND

It is thought that the percentage of the friction loss that occurs between an outer periphery sliding portion of a piston ring that is a sliding member used for a reciprocating internal combustion engine, such as an automotive engine, and a bore of a cylinder liner is about 20 to 30 percent of the friction loss that occurs in the reciprocating internal combustion engine, such as an automotive engine. Reducing the friction loss may improve automotive fuel economy and reduce exhaust gas, and contribute to environmental conservation.

Conventionally, on an outer periphery surface of piston rings, for the purpose of improving wear resistance, a nitrided layer by a nitriding process, a chromium plated film, a hard film by ion plating, such as titanium nitride or chromium nitride, is formed. In addition, in recent years, coating with an amorphous hard carbon film having a high hardness and excellent self-lubrication has been used.

Amorphous hard carbon may be generally called diamond-like carbon (hereinafter referred to as "DLC"), hydrogenated amorphous carbon (a-C:H), i-carbon, or diamond-like carbon or the like, and is characterized in that it is structurally a mixture of a bonding in which the bond of carbon is a diamond structure (sp3 bonding) and a bonding in which the bond of carbon is a graphite structure (sp2 bonding), and has high hardness, wear resistance, thermal conductivity and chemical stability similar to those of a diamond, and also has solid lubrication similar to that of a graphite. Because of these characteristics, DLC has been used for a protecting layer of, for example, a sliding member for automotive components, a mold, a cutting tool, a mechanical component, or an optical component.

For example, relating to a piston ring for an automotive component, a DLC film having a surface structure on which a bulge having a size of 0.5 to 5 micrometers is deposited and is formed to a thickness of 0.5 to 30 micrometers on upper and lower surfaces of a piston ring after the entire surface of these surfaces being gas-nitrided is disclosed. This may prevent aluminum adhesion to the upper and lower surfaces of the piston ring that slides against an aluminum alloy, and reduce the ring groove wear of a piston made of aluminum alloy (see Japanese Patent Publication JP-A-2000-120869). Another example is a DLC film having a thickness of 0.5 to 30 micrometers formed on an underlying film that may be formed either directly on upper and lower surfaces of a piston ring or on a hard surface-treated layer, such as a chromium plated film, a gas-nitrided layer or the like. The underlying film is made of 70 to 100 atomic percent of one type or more than two types of elements selected from the group consisting of Si, Ti, W, Cr, Mo, Nb and V and the remaining content of the film consists of carbon. This may reduce the ring groove wear of a piston made of aluminum alloy (see Japanese Patent Publication JP-A-2000-120870).

A combination of a cylinder made of aluminum alloy and a piston ring with a DLC film being formed on an outer periphery surface thereof is also disclosed (see Japanese Patent Publication JP-A-2001-280497).

In Japanese Patent Applications JP-A-05-163909 and JP-A-07-118832, relating to a cam contact portion structure of a valve mechanism for an internal combustion engine, methods for reducing friction loss by using a hard film are disclosed.

Possible ways effective in reducing the friction loss that occurs between a piston ring outer periphery sliding portion and a cylinder liner bore may be; reducing the tension of the piston ring, optimizing the shape of the piston ring outer periphery, reducing the surface roughness of the piston ring outer periphery, or reducing friction coefficient by surface treatment of the piston ring outer periphery. Another effective way may be to reduce the surface roughness of the cylinder liner.

However, if the tension of the piston ring is excessively reduced, oil consumption may increase or the amount of blowby-gas may increase. In addition, if the surface roughness of the piston ring outer periphery is excessively reduced, seizing-up (scuffing) may occur. Furthermore, the surface roughness of the piston ring outer periphery may gradually decrease as the piston ring, according to the related arts described above, slides in the cylinder liner, and the friction loss that occurs between the piston ring outer periphery sliding portion and the cylinder liner bore may tentatively decrease; however, the wear of the piston ring outer periphery sliding surface may proceed and thus the optimally designed initial shape cannot be maintained. Consequently, the friction loss that occurs between the piston ring outer periphery sliding portion and the cylinder liner bore may increase.

In Japanese Patent Publication JP-A-2000-120869, a sliding surface of the piston ring may be treated to have a surface roughness (Ra) of 0.05 to 1 micrometers, and then the surface is coated with a DLC film having a Vickers hardness of Hv 700 to 2000 and a thickness of 0.5 to 30 micrometers. However, with the film having such a low hardness, self-wearing of the film may increase when it slides against a cylinder liner made of cast iron, and thus break-in effect due to the improvement in the surface roughness of a mating material cannot be obtained. In Japanese Patent Publication JP-A-2000-120870, it is disclosed that even when the DLC film and the underlying film are worn, the chromium plated film, the nitrided layer or an ion plated film may work for wear resistance of the piston ring; however, there is no teaching regarding the initial roughness required for breaking-in against a mating material. As described above, regarding the sliding between a sliding member, especially a piston ring, and a cast iron cylinder, most of the related arts focus on the break-in property of the piston ring, and there is no teaching regarding reduction in friction loss by the break-in effect of a cylinder material. Furthermore, the area of the sliding portion of the piston ring outer periphery and the area of the sliding portion of the cylinder liner bore differ significantly as compared with the areas of other sliding members, and the sliding conditions are different from those above mentioned Japanese Patent Applications JP-A-05-163909 and JP-A-07-118832. Therefore, in the related arts, it has been very difficult to significantly reduce the friction loss that occurs between the piston ring outer periphery sliding portion and the cylinder liner bore.

SUMMARY OF THE INVENTION

In one aspect, the present invention provides a sliding member that has an excellent initial break-in property against a sliding mating material and a significant effect in reducing friction loss, and especially provides a piston ring that may slide against a cylinder liner made of cast iron, and has an excellent initial break-in property and a significant effect in reducing friction loss.

As a result of intensive studies, the present inventors found that multiple microscopic bumps called macro particles are formed on a surface of an amorphous hard carbon film that is formed by a vacuum arc discharge method using carbon cathode as a base material, and when such an amorphous hard carbon film is formed on a surface of a sliding member, a large number of macro particles may excessively wear a mating material, and less macro particles may not be able to sufficiently break in the mating material, and that the surface roughness of the macro particles can be controlled within a desired range by performing a post-processing using hard particles such as a diamond, and can be controlled by ten-point mean roughness (Rz) and initial wear height (Rpk).

The inventors also found that by setting the surface roughness of a bore sliding portion of a cylinder liner made of cast iron, used for an automotive engine, to have a ten-point mean roughness (Rz) of 2 to 4 micrometers, and by controlling the surface roughness of an amorphous hard carbon film formed on a piston ring outer periphery sliding portion by ten-point mean roughness (Rz) and initial wear height (Rpk), the effect in improving the surface roughness of the cylinder liner can be maximized, and the friction loss between the piston ring outer periphery sliding portion and the cylinder liner bore can be reduced to a minimum, and such conditions can be maintained.

In other words, a sliding member according to the present invention is characterized in that a sliding surface of the sliding member is coated with an amorphous hard carbon film, and the surface of the amorphous hard carbon film has a ten-point mean roughness (Rz, JIS B 0601) of equal to or less than 0.7 micrometers and an initial wear height (Rpk, JIS B 0601) in a range of 0.07 to 0.14 micrometers. JIS B 0601 is a Japanese Industrial Standards standard that provides a geometrical product specification for profile methods for surface texture.

For a sliding member according to the present invention, the amorphous hard carbon film may be formed either on a hard chromium-plating layer, a nitrided layer or a chromium nitrided layer, or directly on a base material surface. The chromium nitrided layer may be formed by using a method such as ion plating, and a material having a columnar structure or a porous structure may also be used. For the amorphous hard carbon film, it is preferable that an amorphous hard carbon film being hydrogen-free and substantially made of carbon only is used. The film that is hydrogen-free and substantially made of carbon only refers herein to a film whose percentage of hydrogen content measured by HFS (Hydrogen Forward Scattering) spectrometry is equal to or less than 5 atomic percent, and the remainder of the film substantially consists of carbon only. The film thickness of the amorphous hard carbon film is preferably in a range of 0.01 to 2.0 micrometers. Furthermore, it is preferable that the Vickers hardness of the amorphous hard carbon film is equal to or greater than Hv 2000.

A sliding member according to the present invention may be preferably used especially for an outer periphery sliding surface of a piston ring for an automotive component. A piston ring according to the present invention, when it slides upward and downward in a cylinder liner, may promptly and adequately improve the surface roughness of the cylinder liner surface and cause initial breaking-in, due to an amorphous hard carbon film being formed on a piston ring outer periphery surface and being hydrogen-free and substantially made of carbon only and having a ten-point mean roughness (Rz) of equal to or less than 0.7 micrometers and an initial wear height (Rpk) in a range of 0.07 to 0.14 micrometers. At the same time, the surface roughness of the amorphous hard carbon film formed on the piston ring outer periphery surface may also be promptly reduced. The amorphous hard carbon film has a high hardness and an excellent wear resistance, and thus the initial outer periphery shape of the piston ring being designed into the optimal shape can be maintained.

The surface roughness of a mating material can be improved in a shorter period of time during initial breaking-in, and a significant effect in reducing friction loss can be obtained, and the effect of friction loss can be maintained. Especially in the sliding between a piston ring outer periphery sliding surface and a bore of a cast iron cylinder liner, a significant effect in reducing friction loss can be obtained, and the effect of friction loss can be maintained.

The following reference numerals can be used in conjunction with the drawings:

1 piston ring
2 amorphous hard carbon film
3 outer periphery sliding surface
4 upper and lower surfaces
5 inner circumferential surface
6 piston
7 cylinder liner
8 droplet
9 load measuring sensor

DETAILED DESCRIPTION OF PREFERRED EMBODIMENTS

Preferred embodiments of the present invention will be described.

Figure 1:
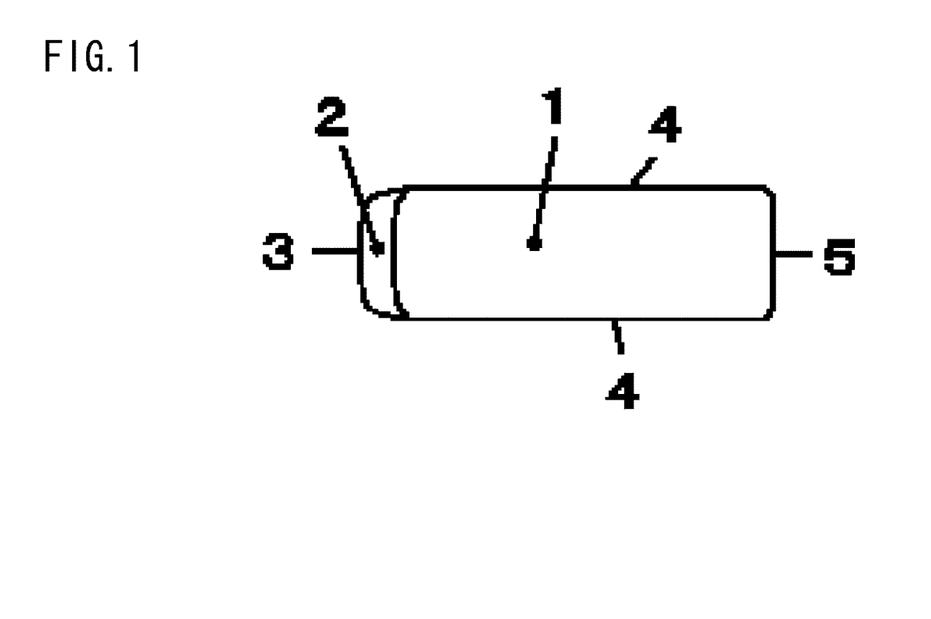
FIG. 1 is a cross-sectional view of a piston ring that is one of a sliding member of the present invention.
Figure 2:
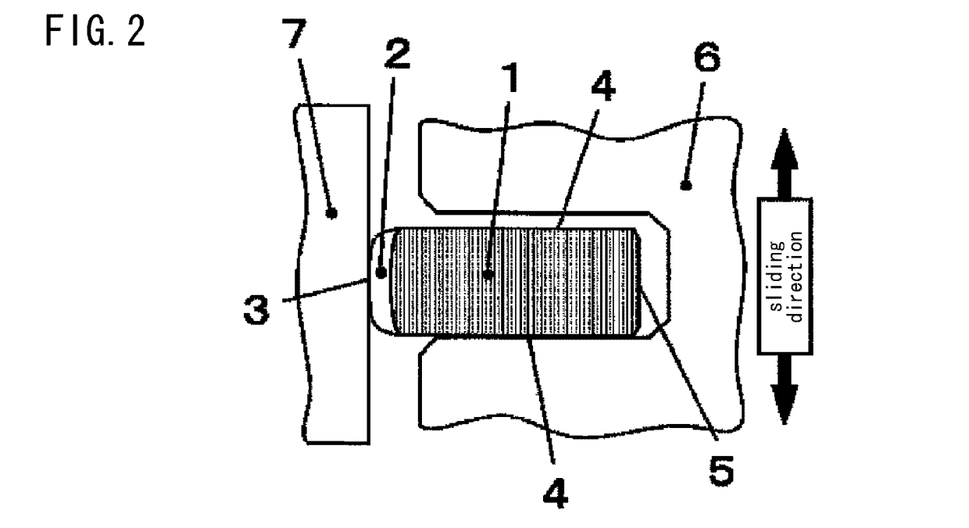
FIG. 2 is a cross-sectional view illustrating a piston ring that is a sliding member of the present invention being fitted to a cylinder liner.

FIG. 1 is a schematic view illustrating a cross-section of a piston ring of a sliding member according to an embodiment of the present invention. On a surface of a piston ring 1, an amorphous hard carbon film 2 is formed. FIG. 2 is a cross-sectional view illustrating the piston ring 1 of FIG. 1 being installed in a piston 6, and then fitted to a cylinder liner 7. The piston ring 1 may slide upward and downward while being installed in the piston 6, keeping an adequate oil film between an outer periphery sliding surface 3 of the piston ring and the cylinder liner 7.

A sliding member according to the present invention is a sliding member in which a sliding surface thereof is coated with an amorphous hard carbon film, and the surface of the amorphous hard carbon film has a ten-point mean roughness (Rz) of equal to or less than 0.7 micrometers and an initial wear height (Rpk) in a range of 0.07 to 0.14 micrometers. If the ten-point mean roughness (Rz) is above 0.7 micrometers, the effect in reducing friction loss becomes smaller, and breaking-in against a mating material requires time, and the initial wear of the mating material becomes greater. If the initial wear height (Rpk) is below 0.07 micrometers, the effect in breaking-in against a mating cylinder liner may become smaller, and if it is above 0.14 micrometers, initial breaking-in may require time, and thus the effect in reducing friction loss cannot be obtained. Therefore, the ten-point mean roughness (Rz) is equal to or less than 0.7 micrometers, and the initial wear height (Rpk) is in a range of 0.07 to 0.14 micrometers.

The surface roughness is measured using a tip of 2 micrometers R for a probe, and a method defined by JIS under conditions of: measuring length of 0.8 mm, cut-off length of 0.08 mm, measuring scaling of 10,000 times magnification, measuring speed of 0.06 mm/sec, cut-off 2RC (phase compensation), and least-squares curve fitting for tilt correction.

The surface roughness of the mating material is preferably a ten-point mean roughness (Rz) in a range of 2 to 4 micrometers, and more preferably Rz in a range of 2.5 to 3.0 micrometers. When a piston ring slides against a cylinder liner made of cast iron, the effect in improving the surface roughness by the initial breaking-in of the cylinder liner may become great and the friction loss can be significantly reduced when the ten-point mean roughness (Rz) is set to in a range of 2 to 4 micrometers.

For a base material of a sliding member of the present invention, an iron-based alloy material can preferably be used. For a material of a piston ring base material according to the present invention, an iron-based material such as 13Cr and 17Cr stainless steel, spring steel, tool steel and cast iron, or a material in which surface treatment is carried out on the iron-based material, such as a chromium nitrided layer by ion plating or the like, a nitrided layer by various nitriding methods, and a hard chromium plating, can be used. An amorphous hard carbon film may be formed either directly on the sliding surface, or on the hard chromium-plating film, the nitrided layer, or the chromium nitrided layer. When applied to a piston ring, it is preferable that, for a top ring, an amorphous hard carbon film is formed on a chromium nitrided layer having a cross-sectional structure being a columnar structure or a predetermined porous structure.

In a case where the amorphous hard carbon film that coats the piston ring outer periphery surface wears away, and then the base material of the piston ring and the ion plating layer, the nitrided layer, the hard chromium-plating layer or the like, formed on the base material surface are exposed, the friction loss that occurs between the piston ring and the cylinder liner does not significantly increase because the surface roughness of the cylinder liner is already sufficiently reduced.

The amorphous hard carbon film being hydrogen-free and substantially made of carbon only is an amorphous hard carbon film whose content of hydrogen is equal to or less than 5 atomic percent, and the film has a higher sp3 property that shows the condition of carbon bonding as compared with a hydrogen-containing amorphous hard carbon film to which metal additives such as Si are added, and thus has a high hardness and an excellent wear resistance. The hydrogen contained in the amorphous hard carbon film can be measured by HFS (Hydrogen Forward Scattering) spectrometry.

The hardness of the amorphous hard carbon film may be preferably a Vickers hardness of equal to or greater than Hv 2000. If the Vickers hardness of the amorphous hard carbon film is below Hv 2000, the effect in improving the surface roughness of the cylinder liner made of cast iron, a mating material, during the initial breaking-in is small, and thus sufficient effect in reducing friction loss may not be obtained. The film thickness of the amorphous hard carbon film is preferably in a range of 0.01 to 2.0 micrometers. By setting the film thickness within the range described above, the amorphous hard carbon film wears away just after it improves the surface roughness of the mating material during the initial breaking-in. With the amorphous hard carbon film having a film thickness below 0.01 micrometers, the effect in improving the surface roughness of the mating material may not be obtained, and a film thickness above 2 micrometers may result in excessive wear of the mating material.

Embodiments of the present invention will be further described in detail, however, the present invention is not limited to these embodiments.

Figure 3:
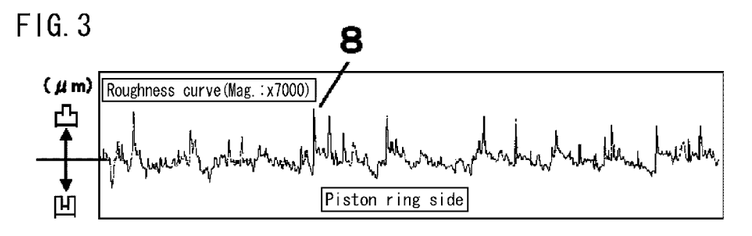
FIG. 3 illustrates measurements of the initial surface roughness of an amorphous hard carbon film formed on a piston ring outer periphery surface according to a first embodiment of the present invention.

In a first example, a material equivalent to SUS440 was used as a base material of piston rings, and a nitrided layer was formed on a surface of the base material by gas-nitriding. An amorphous hard carbon film being hydrogen-free and substantially made of carbon only was formed on an outer periphery sliding surface of a top ring, a second ring, and an oil ring, each having a nominal diameter of 86.0 mm to a film thickness of 1 micrometer. After that, a post-processing (such as lapping or micro abrasive blasting) was carried out using diamond particles to fabricate a first embodiment sample having a surface roughness (Rz) of equal to or less than 0.7 micrometers and Rpk in a range of 0.07 to 0.14 micrometers. FIG. 3 illustrates measurements of the initial surface roughness of the amorphous hard carbon film, taken for the surface roughness of the outer periphery sliding surface (in a circumferential direction) of the piston rings (opposite side of butt ends) according to the first embodiment described above. The portions illustrated on the convex side are macro particles 8, and the surface roughness (Rz) was 0.7 micrometers and Rpk was 0.07 micrometers.

In addition, a material equivalent to SUS440 was used as a base material of piston rings similarly to the first example. As base layer, a chromium nitrided layer by ion plating and a hard chromium-plating layer by electrolytic plating were formed. After that, an amorphous hard carbon film being hydrogen-free and substantially made of carbon only was formed on a sliding surface of a top ring, a second ring, and an oil ring, each having a nominal diameter of 86.0 mm to a film thickness of 1 micrometer. After that, a post-processing was carried out using diamond particles to fabricate a second embodiment sample and a third embodiment sample, each having a surface roughness (Rz) of equal to or less than 0.7 micrometers and Rpk in a range of 0.07 to 0.14 micrometers. Furthermore, without forming a base layer, an amorphous hard carbon film being hydrogen-free and substantially made of carbon only was formed directly on a base material to a film thickness of 1 micrometer, and a post-processing was carried out using diamond particles to fabricate a fourth embodiment sample.

For comparison samples, base layer were formed similarly to the embodiment described above, and an amorphous hard carbon film was formed to a film thickness of 1 micrometer, and then only conditions of the post-processing using diamond particles were varied to fabricate comparison samples 1 to 3 having a surface roughness (Rz) of 0.8 micrometers and Rpk of equal to or greater than 0.15 micrometers. Furthermore, a comparison sample 4 on which only nitriding was carried out to a SUS440-equivalent material, a comparison sample 5 on which only a chromium nitrided layer was provided by ion plating, and a comparison sample 6 on which only a hard chromium plating was formed by electrolytic plating were fabricated. The set of piston rings (top ring, second ring, and oil ring) had a same specification excepting the surface treatment of the outer periphery sliding surface.

Figure 4:
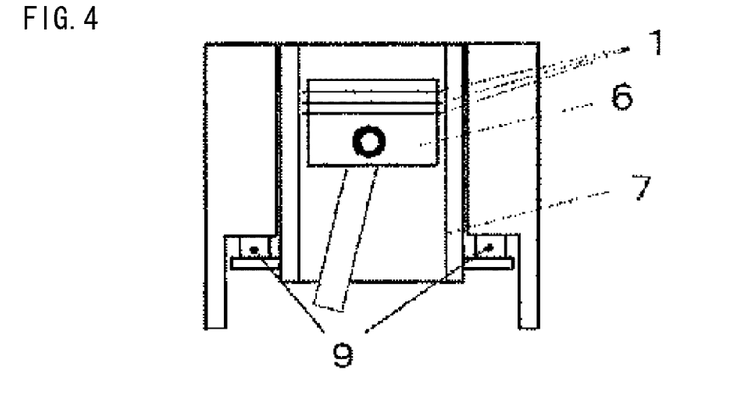
FIG. 4 illustrates the structure of a floating liner typed engine for measuring friction.
Figure 8:
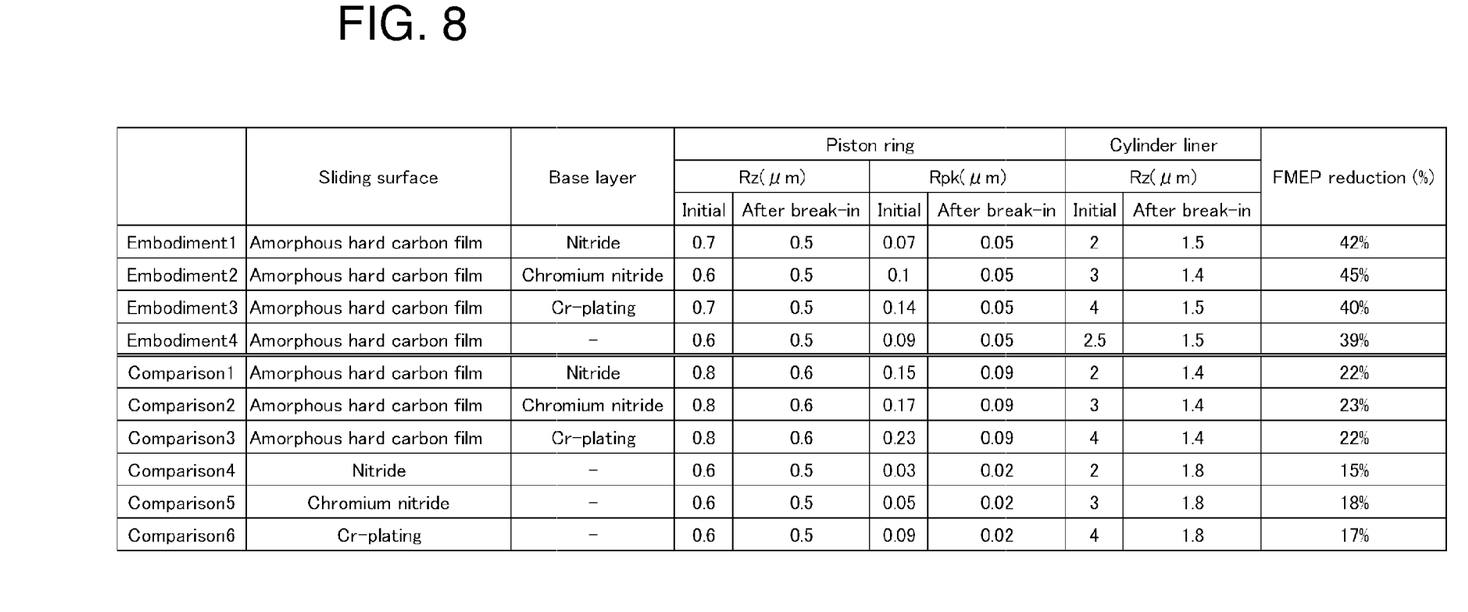
FIG. 8 provides a table with test results of several embodiments.

The sets of piston rings (top ring, second ring, and oil ring) of the embodiments and the comparison samples fabricated as described above were installed in the piston 6, and fitted in a floating liner typed engine for measuring friction, and then the friction loss was evaluated by the Friction Mean Effective Pressure (FMEP). For a mating material that slides against the piston rings, a cast iron cylinder liner whose surface roughness having a ten-point mean roughness (Rz) of 2 to 4 micrometers was used. FIG. 4 illustrates the structure of the floating liner typed engine for measuring friction. The friction applied to the cylinder liner when the piston rings installed in the piston slide upward or downward was measured by a load measuring sensor 9 that is coupled to the cylinder liner. Test conditions in measuring friction loss in the floating liner typed engine for measuring friction are described below. FIG. 8 provides a table that shows results of the test. The tensions of the rings were set to 6.5 N, 5.5 N, 19.4 N, respectively for the top ring, second ring, and oil ring.

Figure 5:
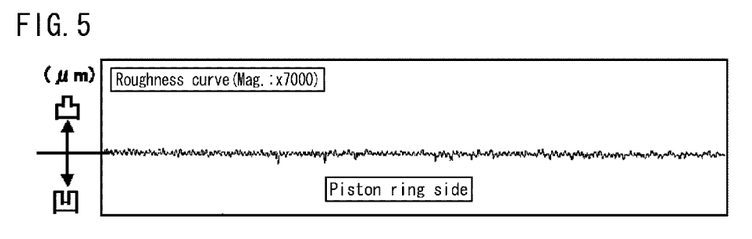
FIG. 5 illustrates measurements of the surface roughness of the amorphous hard carbon film according to the first embodiment after a test by the engine shown in FIG. 4.
Figure 6:
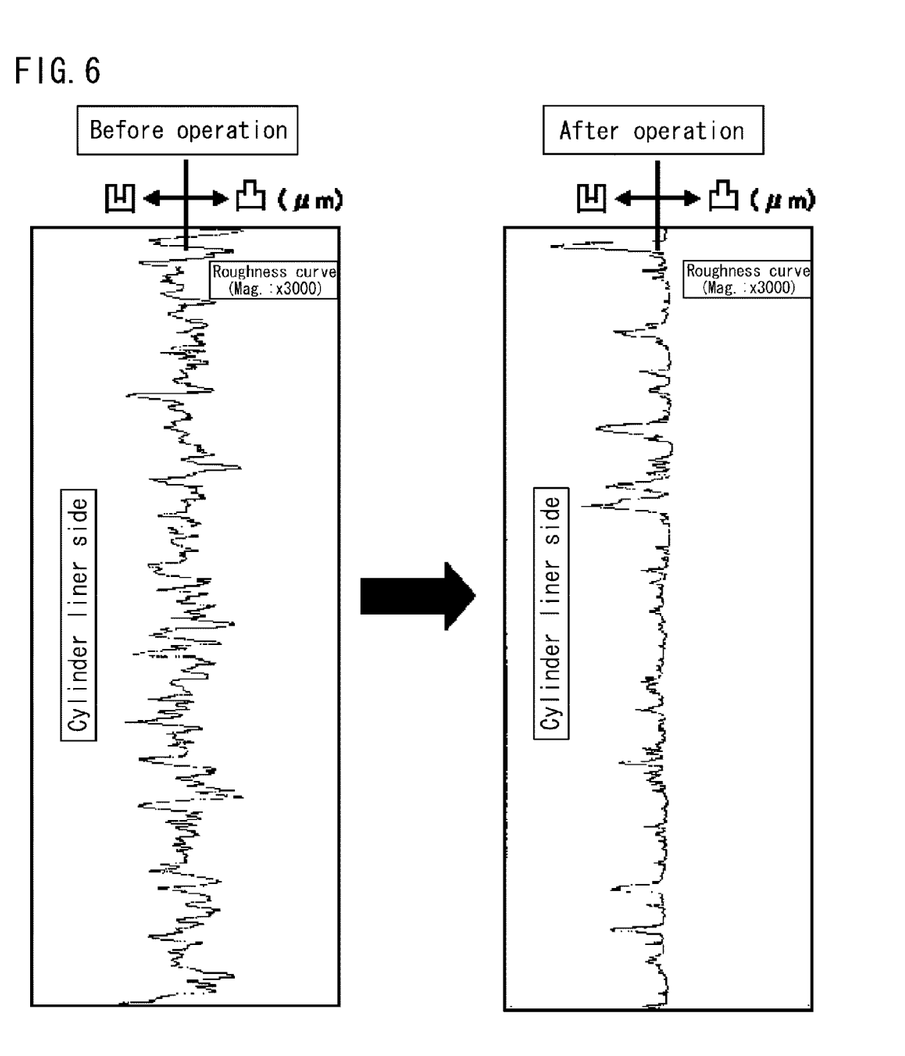
FIG. 6 illustrates measurements of the surface roughness of the cylinder liner according to the first embodiment before and after the test by the engine shown in FIG. 4.

Engine RPM: 1,500 rpm
Load: 15 N·m
Lubricant temperature: 90 degrees centigrade
Cooling water temperature: 100 degrees centigrade
Test duration: 10 hours FIG. 5 illustrates results of measurement of the surface roughness of the piston ring outer periphery sliding surface of the first embodiment after the test by the floating liner typed engine for measuring friction shown in FIG. 4. By comparing FIG. 5 with FIG. 3 that shows the results before the test, it is observed that large amounts of the macro particles 8 that existed on the outer periphery sliding surface of the piston ring were almost completely removed, and the roughness of the piston ring outer periphery sliding surface was significantly reduced. Similarly, FIG. 6 illustrates the surface of the cylinder liner according to the first embodiment before and after the test. The cylinder liner that slides against the piston rings according to the present invention adequately improved in the surface roughness, and sufficient breaking-in was provided. Specifically, the bumps on the cylinder liner surface were removed by the sliding against the piston rings, and became smooth.

Figure 7:
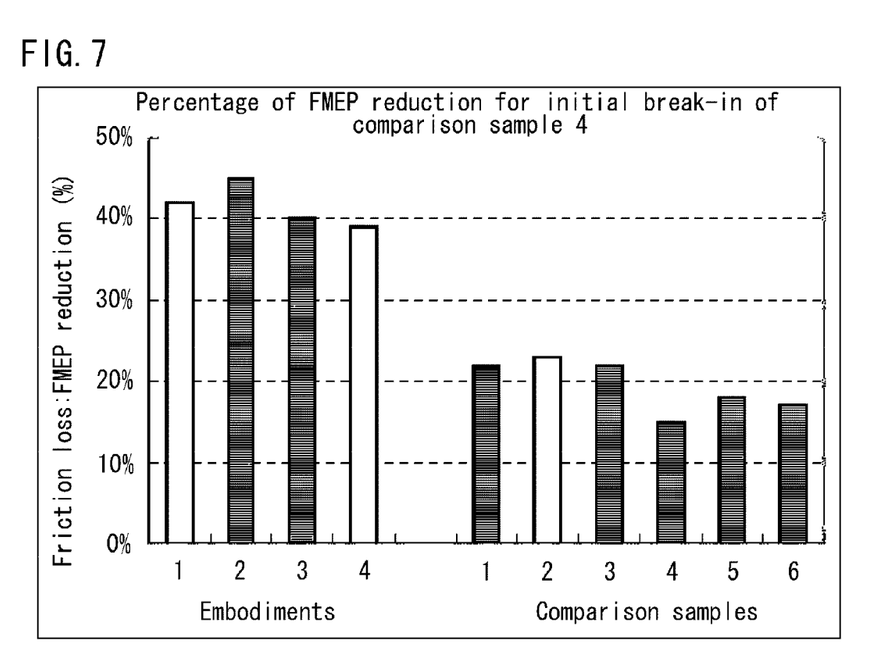
FIG. 7 illustrates the percentage of reduction in friction loss of the embodiments and comparison samples.

FIG. 7 illustrates the percentage of reduction in friction loss of the embodiments and comparison samples by the test shown in FIG. 4. As a result, a noticeable effect was observed, such that the piston ring being a sliding member according to the present invention can achieve a significant friction loss reduction of about 40 percent, as compared with the friction loss in the initial breaking-in of the comparison sample 4. In contrast, it is observed that the friction loss reduction of the comparison samples 1 to 3 in which the surface roughness (Rz) of the amorphous hard carbon film was 0.8 micrometers and Rpk was equal to or greater than 0.15 micrometers and the reduction of the comparison samples 4 and 5, in which only conventional surface treatment was carried out, were equal to or less than half of the friction loss reduction of the present invention, and the effect in reducing friction loss was not sufficient.

Although the embodiments of the present invention were described for the cases where a piston ring outer periphery was coated with an amorphous hard carbon film, other than these embodiments, a similar effect can be obtained with a hard film such as chromium nitride, titanium nitride, or diamond.

The invention claimed is:

1. A sliding member, comprising:
   a sliding member body having a sliding surface; and
   an amorphous hard carbon film coating the sliding surface, a surface of the amorphous hard carbon film having a ten-point mean roughness of equal to or less than 0.7 micrometers and an initial wear height in a range of 0.07 to 0.14 micrometers,
   wherein a surface roughness of a mating material for the sliding member is a ten-point mean roughness (Rz) in a range of 2 to 4 micrometers and wherein the amorphous hard carbon film is hydrogen-free and substantially made of carbon only.

2. The sliding member according to claim 1, further comprising a hard chromium-plating layer, wherein the amorphous hard carbon film is formed on the hard chromium-plating layer.

3. The sliding member according to claim 1, further comprising a nitrided layer, wherein the amorphous hard carbon film is formed on the nitrided layer.

4. The sliding member according to claim 1, further comprising a chromium nitrided layer, wherein the amorphous hard carbon film is formed on the chromium nitrided layer.

5. The sliding member according to claim 1, wherein the amorphous hard carbon film is formed directly on a surface of a base material of the sliding member body.

6. The sliding member according to claim 1, wherein the amorphous hard carbon film has a Vickers hardness of equal to or greater than Hv 2000.

7. The sliding member according to claim 6, wherein the amorphous hard carbon film has a thickness in a range of 0.01 to 2.0 micrometers.

8. The sliding member according to claim 1, wherein the amorphous hard carbon film has a thickness in a range of 0.01 to 2.0 micrometers.

9. The sliding member according to claim 1, wherein the sliding member is a piston ring, and the sliding surface is at least a piston ring outer periphery surface.

10. A mechanical apparatus comprising:
    a piston including a groove; and
    a piston ring disposed within the groove, the piston ring having a sliding surface that is coated with an amorphous hard carbon film, a surface of the amorphous hard carbon film having a ten-point mean roughness of equal to or less than 0.7 micrometers and an initial wear height in a range of 0.07 to 0.14 micrometers
    wherein a surface roughness of a mating material is a ten-point mean roughness (Rz) in a range of 2 to 4 micrometers and wherein the amorphous hard carbon film is hydrogen-free and substantially made of carbon only.

11. The apparatus according to claim 10, further comprising a cylinder, the piston disposed within the cylinder, such that the sliding surface of the piston ring is adjacent the cylinder, wherein the mating material is part of the cylinder.

12. The apparatus according to claim 10, wherein the amorphous hard carbon film is formed on a hard chromium-plating layer, a nitrided layer, or a chromium nitrided layer.

13. The apparatus according to claim 10, wherein the amorphous hard carbon film is formed directly on a surface of a base material of the piston ring.

14. The apparatus according to claim 10, wherein the amorphous hard carbon film is hydrogen-free and substantially made of carbon only.

15. The apparatus according to claim 10, wherein the amorphous hard carbon film has a Vickers hardness of equal to or greater than Hv 2000 and a thickness in a range of 0.01 to 2.0 micrometers.

16. An apparatus, comprising:
a sliding member body having a sliding surface;
an amorphous hard carbon film coating the sliding surface, a surface of the amorphous hard carbon film having a ten-point mean roughness of equal to or less than 0.7 micrometers and an initial wear height in a range of 0.07 to 0.14 micrometers, wherein the amorphous hard carbon film is hydrogen-free and substantially made of carbon only; and
a mating material located to be in sliding contact with the sliding surface of the sliding member, wherein a surface roughness of a mating material is a ten-point mean roughness (Rz) in a range of 2 to 4 micrometers.

17. The apparatus according to claim 16, wherein the sliding surface comprises a surface of a piston ring and wherein the mating material comprises a surface of a cylinder.

* * * * *